(12) United States Patent
Ramesh et al.

(10) Patent No.: US 12,067,009 B2
(45) Date of Patent: Aug. 20, 2024

(54) PREDICTIVE QUERY PARSING TIME AND OPTIMIZATION

(71) Applicant: Teradata US, Inc., Dayton, OH (US)

(72) Inventors: Bhashyam Ramesh, Secunderabad (IN); Jaiprakash Ganpatrao Chimanchode, PeeranCheruvu Hyderabad (IN); Naveen Thaliyil Sankaran, Kerala (IN); Jitendra Yasaswi Bharadwaj Katta, Andhra Pradesh (IN)

(73) Assignee: Teradata US, Inc., San Diego, CA (US)

( * ) Notice: Subject to any disclaimer, the term of this patent is extended or adjusted under 35 U.S.C. 154(b) by 427 days.

(21) Appl. No.: 16/214,280

(22) Filed: Dec. 10, 2018

(65) Prior Publication Data

US 2020/0183936 A1     Jun. 11, 2020

(51) Int. Cl.
| | | |
|---|---|---|
| *G06F 16/2453* | (2019.01) | |
| *G06N 3/08* | (2023.01) | |
| *G06N 20/00* | (2019.01) | |
| *H04L 41/5003* | (2022.01) | |

(52) U.S. Cl.
CPC .... *G06F 16/24545* (2019.01); *G06F 16/2453* (2019.01); *G06N 3/08* (2013.01); *G06N 20/00* (2019.01); *H04L 41/5003* (2013.01)

(58) Field of Classification Search
CPC . G06F 16/24545; G06F 16/2453; G06N 3/08; G06N 20/00; H04L 41/5003
See application file for complete search history.

(56) References Cited

U.S. PATENT DOCUMENTS

| | | | | |
|---|---|---|---|---|
| 5,511,213 | A | | 4/1996 | Correa |
| 5,761,493 | A | * | 6/1998 | Blakeley ................. G06F 8/315 |
| 6,061,676 | A | * | 5/2000 | Srivastava ........ G06F 16/24537 |
| | | | | 707/694 |
| 6,182,029 | B1 | * | 1/2001 | Friedman .............. G06F 40/289 |
| | | | | 715/236 |
| 6,223,205 | B1 | * | 4/2001 | Harchol-Balter ....... G06F 9/505 |
| | | | | 718/105 |
| 6,321,218 | B1 | * | 11/2001 | Guay .................. G06F 16/2272 |
| 6,353,826 | B1 | * | 3/2002 | Seputis ............. G06F 16/24542 |
| | | | | 707/999.005 |

(Continued)

OTHER PUBLICATIONS

Lee et al., "Regression-Based Self-Tuning Modeling of Smooth User-Defined Function Costs for an Object-Relational Database Management System Query Optimizer" 2004, University of Vermont.*

(Continued)

*Primary Examiner* — Anhtai V Tran
*Assistant Examiner* — Huen Wong
(74) *Attorney, Agent, or Firm* — Gates & Cooper LLP (57) ABSTRACT

A query is preprocessed for features identified by a Data Manipulation Language (DML) in the text of the query. A machine-learning algorithm uses the features as input and provides as output a predicted query parsing execution time needed by a query parser to parse the query. The predicted query parsing time is provided as input to a query optimizer. The query optimizer uses the predicted query parsing time as a factor in optimizing a query execution plan for the query. Subsequently, the query execution plan is executed against a database as the query.

20 Claims, 7 Drawing Sheets

(56) References Cited

U.S. PATENT DOCUMENTS

| | | | |
|---|---|---|---|
| 6,766,320 | B1 | 7/2004 | Homere |
| 8,621,482 | B1* | 12/2013 | Ramesh .............. G06F 9/5027 |
| | | | 718/106 |
| 8,745,065 | B2* | 6/2014 | Wang ................ G06F 16/29 |
| | | | 707/723 |
| 9,218,390 | B2 | 12/2015 | Feng et al. |
| 9,355,139 | B2* | 5/2016 | Lewak ............... G06F 16/242 |
| 9,378,243 | B1* | 6/2016 | Korlapati .......... G06F 16/24537 |
| 9,477,707 | B2* | 10/2016 | Chi ................. G06F 16/2453 |
| 9,727,942 | B2* | 8/2017 | Nagai ................ G06F 9/5044 |
| 11,055,331 | B1* | 7/2021 | Neumann ........... G06F 16/3332 |
| 11,531,657 | B1* | 12/2022 | Sankaran ............ G06N 20/00 |
| 11,544,236 | B2* | 1/2023 | Brown .............. G06F 16/21 |
| 2003/0009321 | A1* | 1/2003 | Attwater ............ G10L 15/26 |
| | | | 704/E15.045 |
| 2004/0249795 | A1* | 12/2004 | Brockway .......... G06F 16/9532 |
| 2004/0249824 | A1* | 12/2004 | Brockway .......... G06F 16/81 |
| 2005/0055672 | A1* | 3/2005 | Ramacher .......... G06F 16/2308 |
| | | | 717/127 |
| 2005/0055673 | A1* | 3/2005 | Dias ................ G06F 16/217 |
| | | | 717/127 |
| 2008/0195577 | A1* | 8/2008 | Fan ................. G06F 16/24545 |
| 2008/0270346 | A1* | 10/2008 | Mehta .............. G06F 16/24542 |
| 2009/0006343 | A1* | 1/2009 | Platt ................ G06F 16/242 |
| 2009/0037404 | A1* | 2/2009 | Lee ................. G06F 16/24542 |
| | | | 707/999.005 |
| 2009/0100004 | A1* | 4/2009 | Andrei .............. G06F 16/2453 |
| 2009/0106214 | A1* | 4/2009 | Jain ................ G06F 16/24568 |
| 2009/0299989 | A1* | 12/2009 | Zhang .............. G06F 16/24545 |
| | | | 707/999.005 |
| 2010/0082599 | A1* | 4/2010 | Graefe .............. G06F 16/217 |
| | | | 707/E17.014 |
| 2010/0235349 | A1* | 9/2010 | Kuno ............... G06F 16/217 |
| | | | 707/718 |
| 2012/0089596 | A1* | 4/2012 | Siddiqui ........... G06F 16/24542 |
| | | | 707/718 |
| 2012/0130988 | A1* | 5/2012 | Nica ................ G06F 16/24542 |
| | | | 707/718 |
| 2012/0296936 | A1* | 11/2012 | Nagatoshi .......... G06F 16/2453 |
| | | | 707/E17.014 |
| 2013/0151504 | A1* | 6/2013 | Konig .............. G06F 16/245 |
| | | | 707/718 |
| 2014/0214793 | A1* | 7/2014 | Tatemura ........... G06F 16/2453 |
| | | | 707/713 |
| 2014/0214880 | A1* | 7/2014 | Chi ................ G06F 16/2453 |
| | | | 707/768 |
| 2014/0280035 | A1* | 9/2014 | Fraser .............. G06F 16/24542 |
| | | | 707/718 |
| 2015/0088919 | A1* | 3/2015 | Hunter ............. G06F 16/24535 |
| | | | 707/759 |
| 2016/0179890 | A1* | 6/2016 | Chiang ............. G06F 16/24544 |
| | | | 707/714 |
| 2016/0203404 | A1* | 7/2016 | Cherkasova ......... G06N 5/04 |
| | | | 706/12 |
| 2017/0123877 | A1* | 5/2017 | Gongloor ........... G06F 11/3466 |
| 2017/0323001 | A1* | 11/2017 | Schwing ........... G06F 16/284 |
| 2018/0278647 | A1* | 9/2018 | Gabaev ............ H04L 63/1458 |
| 2018/0314735 | A1* | 11/2018 | Liu ................ G06N 5/04 |
| 2018/0336244 | A1* | 11/2018 | Barsness .......... G06F 16/24549 |
| 2019/0258631 | A1* | 8/2019 | Pal ................ G06F 16/24545 |
| 2020/0042647 | A1* | 2/2020 | Pandey ............. G06N 20/00 |
| 2023/0205596 | A1* | 6/2023 | Sankaran ........... G06F 9/505 |
| | | | 718/105 |

OTHER PUBLICATIONS

Ramesh et al., "Optimizer Time Estimation for SQL Queries", ACM (Year: 2018).*

Xu et al., "Learning to Optimize Federated Queries", University of Illinois (Year: 2019).*

Ganapathi et al., "Predicting Multiple Metrics for Queries: Better Decisions Enabled by Machine Learning", IEEE (Year: 2009).*

\* cited by examiner

PREDICTIVE QUERY PARSING TIME AND OPTIMIZATION

BACKGROUND

Most database vendors provide support (in Data Manipulation Language (DML) syntax) for query processing against structured and/or unstructured data. Large-scale commercial databases can process queries that can take a significant amount of time to complete given the complexities of the queries, resources available to the databases, memory and processing loads of the resources, and the data storage sizes of the databases.

As a result, database architectures include query parsers and query optimizers that optimally assemble a user-defined query from the DML syntax into low-level constructs forming a query execution plan that can best utilize the hardware and software resources of the database to efficiently execute the user-defined query in an acceptable and timely fashion.

The parser can deconstruct components of a single query provided in the DML syntax into multiple equivalent versions of the query for processing by the optimizer. Similarly, the optimizer can produce multiple query execution plans for a given parsed query provided by the parser. Each alternative query execution plan is equivalent (will produce the same query results) to the other produced query execution plans for the parsed query. Each different version produced by the parser for input to the optimizer and each different execution plan produced by the optimizer may focus on optimizing different aspects of the query, such that selection of the best version is dependent on a multiplicity of factors and/or a state of the database.

The parser and the optimizer also utilize hardware and software resources of the database. Consequently, query scheduling, query optimization, and query caching are all activities that are affected by the amount of time that it takes the parser to parse the query, the amount of time that it takes the optimizer to optimize the query, and the amount of time that it takes to process the execution plan for the optimized query.

Sometimes, the query parsing time and/or the query optimization time may exceed the actual query execution time for the plan produced by the optimizer. As such, there is a point of diminishing returns in which it becomes non-optimal to attempt to continue optimizing a given query.

Another consideration with any given query's parsing, optimization, and execution is any Service-Level Agreement (SLA) in which a given user is assured of a predetermined level of responsiveness from the database for query execution. SLAs may apply to a given customer of the database, a given user of the customer, and/or a given query or a given type of query.

SUMMARY

In various embodiments, a system, methods, and a database for predictive query parsing time and optimization are provided.

In one embodiment, a method for predictive query parsing time and optimization is provided. A query is parsed for features present in the query. The features are inputted as input to a trained machine-learning algorithm. An estimated amount of time necessary for a query parser to fully parse the query into database constructs is received as output from the trained machine-learning algorithm. The estimated amount of time and the database constructs are processed for producing a query execution plan for the query that accounts for the estimated amount of time in combination with the database constructs.

DETAILED DESCRIPTION

As used herein, the terms and phrases "database," and "data warehouse" may be used interchangeably and synonymously. That is, a data warehouse may be viewed as a collection of databases or a collection of data from diverse and different data sources that provides a centralized access and federated view of the data from the different data sources through the data warehouse (may be referred to as just"warehouse").

Predicting query parsing time and query execution time in a database is useful for many database operations, such as and by way of example only, query scheduling, query caching, a query optimizations performed by a query optimizer, and SLA compliance for contractual obligations with customers of the database.

However, there are tradeoffs that must be accounted for when knowing the query parsing and execution time of a query before query optimization. The query optimizer can make different optimizations based on the parsing and execution times of a query.

For example, if a database (the parser and the optimizer) spends more time parsing and/or optimizing a query than it takes for the query to actually execute, the optimizer (if it had such knowledge before optimization) can reduce parsing time or some optimization processing without affecting the execution plan for the query.

Conversely, the optimizer may spend more time optimizing a given query if it knows that the execution time for the query is high in an effort to reduce the execution time of the query.

Additionally, prediction of the parsing and execution time of a query can help predict if a query is in compliance with a SLA even before the query parsing has started. Such knowledge, helps to tune the database parameters automatically or optimize the query differently (such as increase look ahead processing to produce a better execution plan or to make more use of query execution optimizations, such as in-memory optimizations or Graphics Processing Unit (GPU) accelerators for some of the query operations).

The goal in the industry is to create autonomous workload management capabilities for database systems. To this end, an accurate estimation of query parsing time and query elapsed execution time is of import. The sooner these time estimations are known for a given query in a given DML (such as Structured Query Language (SQL) and others), the more focused and meaningful the query optimizations can be.

Conventionally, the query execution time is predicted after the query optimizer produces the query execution plan for the query, such practice is only useful in revising the query and producing a different optimization. This iteration with revised optimizations is also time consuming and expends resources (hardware and software) of the database.

Figure 1A:
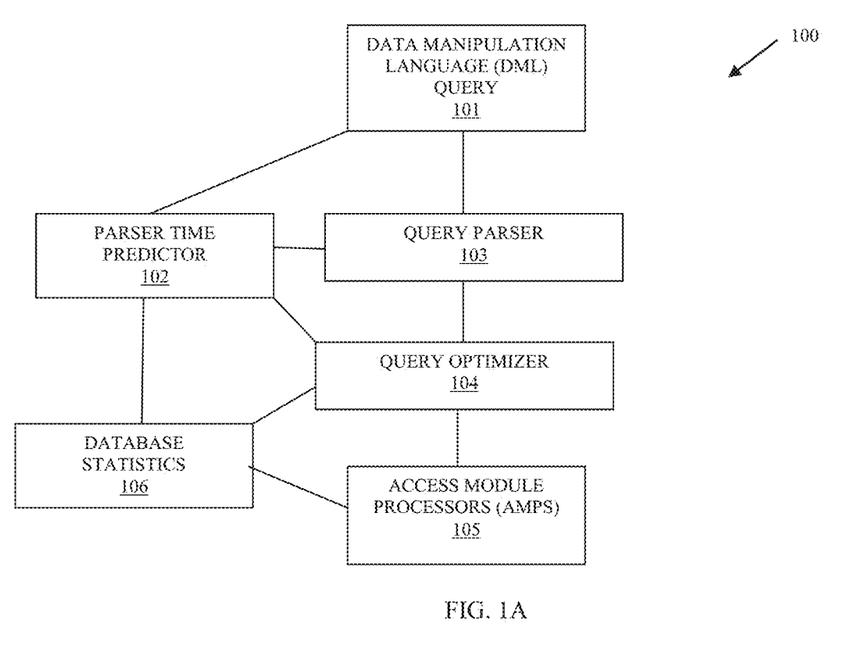
FIG. 1A is a diagram of a system for predictive query parsing time and optimization, according to an embodiment.
Figure 1B:
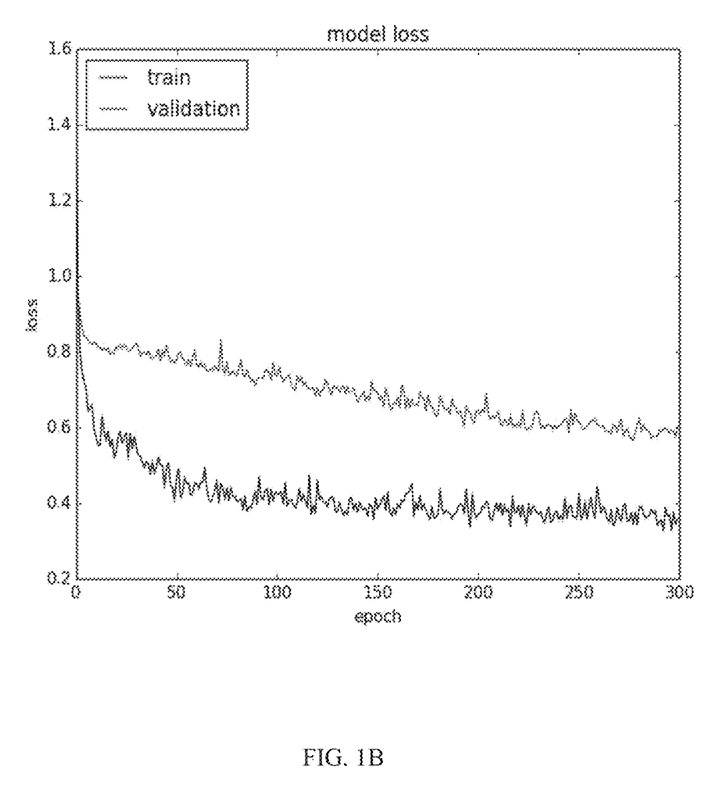
FIG. 1B is a diagram illustrating training and validation results for a regression-based machine learning implementation of the predictive query parsing time for a Neural Network, according to an example embodiment.
Figure 1C:
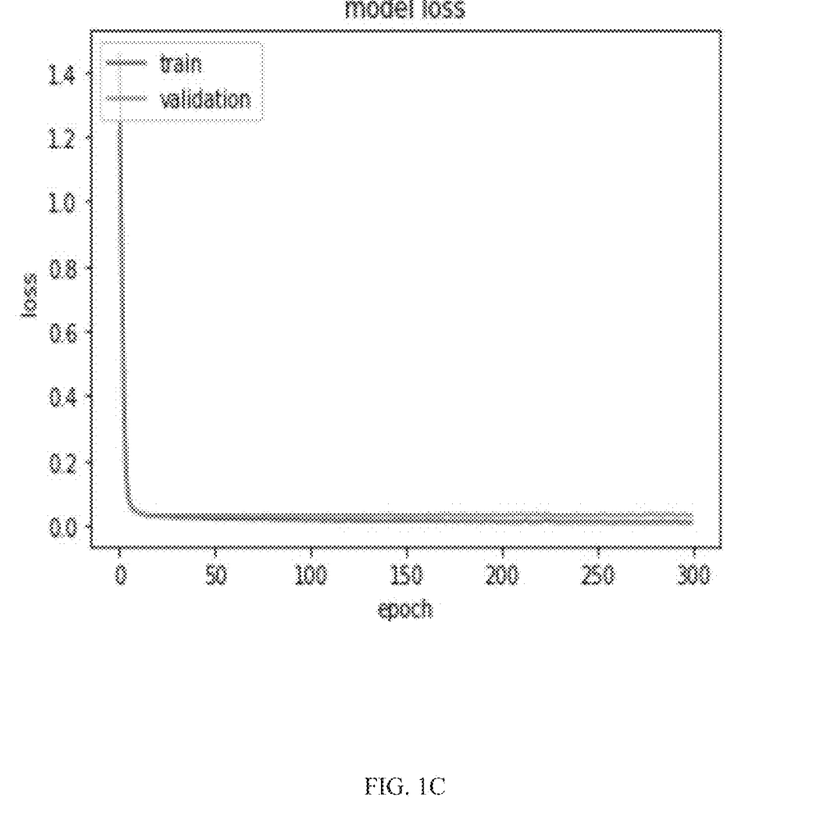
FIG. 1C is a diagram illustrating training and validation results for a classification-based machine learning implementation of the predictive query parsing time for a Neural Network, according to an example embodiment.

FIG. 1A is a diagram of a system 100 for predictive query parsing time and optimization, according to an embodiment. It is to be noted that the components of the system 100 are shown in greatly simplified form with only those components necessary for understanding the predictive query parsing time and optimization teachings illustrated.

Moreover, various embodiments depicted herein are implemented as one or more software modules, which are programmed within memory and/or non-transitory computer-readable storage media as executable instructions that are executed on one or more hardware processing devices (having memory, storage, network connections, one or more processors, etc.).

The system 100 includes a DML query 101, a parser time predictor 102, a query parser 103, a query optimizer 104, a plurality of Access Module Processors (AMPs) 105, and database statistics 106.

Query parsing time is a function of many SQL-supported operations (SQL is one type of DML), such as projections, number of database tables, joins present in the query 101, presence of different SQL clauses (such as GROUP BY, ORDER BY, etc.), and other supported operations. Query parsing time is also dependent on the number of views, nested views, join indexes, and other indexes present on the tables and referenced in the query 101 as the time is spent on processing different optimizations and resolutions of these types of database objects (constructs).

The following is an example list of SQL features that are considered as input to a machine-learning and machine-trained parser time predictor 102. The predictor 102 outputs an estimated parsing time for a given query 101 based on the presence of or lack of these SQL features or outputs a classification assignment for the predictive parsing time for the query 101.

```
SELECT
FROM
INNER JOIN
LEFT OUTER JOIN
FULL OUTER JOIN
RIGHT OUTER JOIN
WHERE
AND
OR
LIKE
CASE WHEN
GROUP BY
ORDER BY
SORT
COUNT
```

-continued

```
SUM
AVG
MIN
MAX
DISTINCT
MODE
MEDIAN
UNION
NORMALIZE
TABLES COUNT
TOP
SAMPLE
HAVING
QUALIFY
EXPAND
UDF
UDM
IN or NOTIN clauses
IN or NOTIN elements
MINUS
IS NULL or IS NOT NULL
```

In an embodiment, the predictor 102 also uses as input features of the query 101 for the number of views (including complexity of WHERE clauses in the query 101), the number of nested views, and the number of join indexes used by the query 101.

As used herein, "features" or "factors" refer to the above-mentioned constructs and operations defined in a given query 101 using a query editor or query interface to the database.

Initially, the predictor 102 is trained on queries 101 utilizing as input the above-noted features present in the syntax and semantics of queries 101 and the actual parsing execution times needed by the parser 103 as obtained from the database statistics 106 once the queries 101 are fully parsed by the parser 103. The predictor 102 may be a neural network algorithm that weights the various features/factors provided as input from the queries 101 in order to calculate the actual known query parsing times based the features/factors. Training can also be iterative, such as given a query 101 with its known features and an expected query parsing time, the predictor 102 is instructed to keep iteratively processing the features until it has an algorithm that produces the expected query parsing time from the query 101.

The query parser 103 is modified or a separate software module (not shown in the FIG. 1) is modified to quickly and rapidly return from a given query 101 the features used as input by the predictor 102 without fully parsing the query 101 for optimization by the optimizer 104. In some embodiments, this pre-parsing can also be done by a front-end software module of the predictor 102.

The preprocessed initial features for the query 101 and a query identifier are provided as input to the trained predictor 102. The output from the trained predictor 102 is the predictive parsing execution time for the query 101 or a classification for the estimated parsing execution time (classified into buckets, such as classification identifier number 1 between 0-1 seconds, classification identifier number 2 between 1-5 seconds, classification identifier number 3 between 5-10 seconds, etc.).

It is to be noted the time estimation for the parsing required by the parser 103 for a given query 101 can be based on actual Central Processing Unit (CPU) time and/or elapsed time (when received by the parser 103 and when completed by the parser 103). This approach with the predictor 102 can also be used for resource consumption used by the CPU and/or with respect Input/Output (I/O).

The predictor 102 can utilize a regression approach, such that the exact parse time for the query 101 as needed by the parser 103 to parse the query 101 is provided as output. Alternatively, the predictor 102 can utilize a classification approach (as discussed above), such that an estimated parse time for the query 101 as needed by the parser 103 to parse the query 101 is provided as a classification identifier, where the classification identifier is a range of estimated parsing execution time.

Additionally, the processing phase at which the predictor 102 is processed for a submitted query 101 can vary.

The predictor 102 is now discussed within the context of an example trial test. Approximately, 111,000 queries 101 were processed. 70% of the 111,000 queries 101 were used to train the predictor 102 and 30% of the 111,000 queries 101 were used as testing on the trained predictor 102.

In the regression-based version of the predictor 102, the predictor 102 was processed to provide an exact value of time required to parse a given query 101 provided as input to the predictor 102. The features present in the query 101 was extracted along with a frequency number that identified the frequency with which each feature occurred in the query 101. The features were normalized to a unit Gaussian. The regression-version of the predictor 102 was trained on the normalized features extracted from the queries 101 along with expected parsing times that was desired as output from the predictor 102. The accuracy of the results were measured as a Mean Squared Error (MSE) and $R^2$ coefficient.

A Support Vector Machine (SVM) regressor, an Ensemble Tree regressor, and a Neural Network (NN) regressor were processed for the machine-learning algorithm of the predictor 102. Results indicated that the NN regressor provided the best accuracy and on the test set (30% of 111,000 queries), the NN regressor implementation of the predictor 102 provided a MSE of 0.30 and R2 value of 0.873. The NN regressor implementation training curves are shown in the FIG. 1B.

In a classification-based version of the predictor 102, the same 111,000 queries 101 were processed. The trained output for the parsing time of the parser was confined to six classification buckets for the parsing time as follows:

| Parse Time (in sec.) | Class ID |
| --- | --- |
| 0-1 | 1 |
| 1-5 | 2 |
| 5-10 | 3 |
| 10-20 | 4 |
| 20-35 | 5 |
| >35 | 6 |

A Multi-Layered Perceptron (MLP) algorithm with 3 layers was used for the predictor 102. There was a single hidden layer with 128 hidden units having approximately 5,200 parameters. A Tan h function was used as the activation function and the learning rate was optimized using an Adam optimizer. Training and validation of the NN used for classification output provided by the predictor 102 for the test is shown in the FIG. 1C.

Multiple NNs were tested during the trial with different configurations (layers, weights, etc.) to obtain a highest per-class accuracy model for the classification-based predictor 102. Three models were compared: model M1 having approximately 5,200 parameters, model M2 having approximately 11,300 parameters, and model M3 having approximately 14,400 parameters. The models were trained on batch sizes of 256. The M1 demonstrated superior performance on validation and on the test set. Comparisons of per-class accuracy of the three models M1-M3 are shown in the FIG. 1D.

Figure 1D:
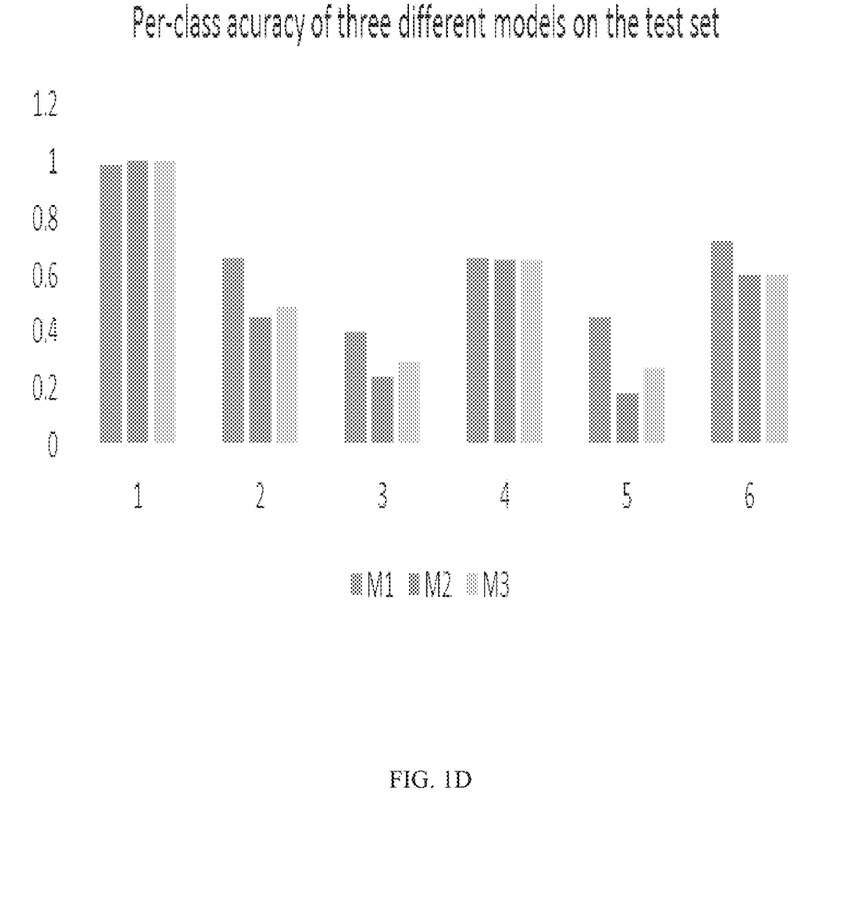
FIG. 1D is a diagram illustrating comparisons between three models on per-classification accuracy of a classification-based machine learning implementation of the predictive query parsing time for a Neural Network, according to an example embodiment.

The overall accuracy of the results was approximately 99.5%. Per class accuracy was 99.9%, 66.12%, 40.6%, 66.31%, 45%, and 72%.

The confusion matrix, which shows the intra-class confusion is as follows:

|  | 1 | 5 | 10 | 20 | 35 | >35 |
| --- | --- | --- | --- | --- | --- | --- |
| 1 | 33098 | 14 | 1 | 0 | 0 | 5 |
| 5 | 73 | 157 | 6 | 1 | 0 | 0 |
| 10 | 15 | 13 | 24 | 5 | 1 | 1 |
| 20 | 1 | 1 | 10 | 32 | 3 | 1 |
| 35 | 4 | 1 | 3 | 4 | 10 | 0 |
| >35 | 4 | 0 | 0 | 0 | 3 | 18 |

The output from the predictor 102 is provided to a modified and enhanced version of the optimizer 104 as input (the optimizer 104 is enhanced to receive as input the expected, estimated, or predicted parsing time for the parser 103). The optimizer 104 may also take as input parameters or metrics associated with a SLA for the query 101. The optimizer 104 is configured to use the predicted parsing time provided by the predictor 102 and any SLA metrics, to identify an amount of optimization and the types of optimization to focus on when the query execution plan is produced by the optimizer 104 for the query 101 (some specific types of optimizations to focus on were discussed above). This provides a directed and focused approach to the optimization of the query 101 and allows for a more autonomous workload management database. This approach is resource (hardware and software) efficient and intelligent because the optimizer knows based on the predictive parsing time, the complexities of the query 101 and based on the parsed constructs (features) can focus on specific optimizations to improve query execution times.

Once the execution plan is produced by the optimizer 104, the query 101 is scheduled for execution by the AMPs 105 within the database. The execution plan was tailored and focused by the optimizer 104 based on the parsing time prediction (exact time or classification-based) provided as input by the predictor 102. The execution plan identifies segments of the query 101 along with resources needed (hardware and software) for each AMP 105.

As used herein, "query optimization" refers to directed and focused query execution plan production by the optimizer 104 based on a predicted parsing time for a parser 103 as provided by the machine-learning and machine-trained predictor 104.

The above-discussed embodiments and other embodiments are now discussed with reference to the FIGS. 2-4.

Figure 2:
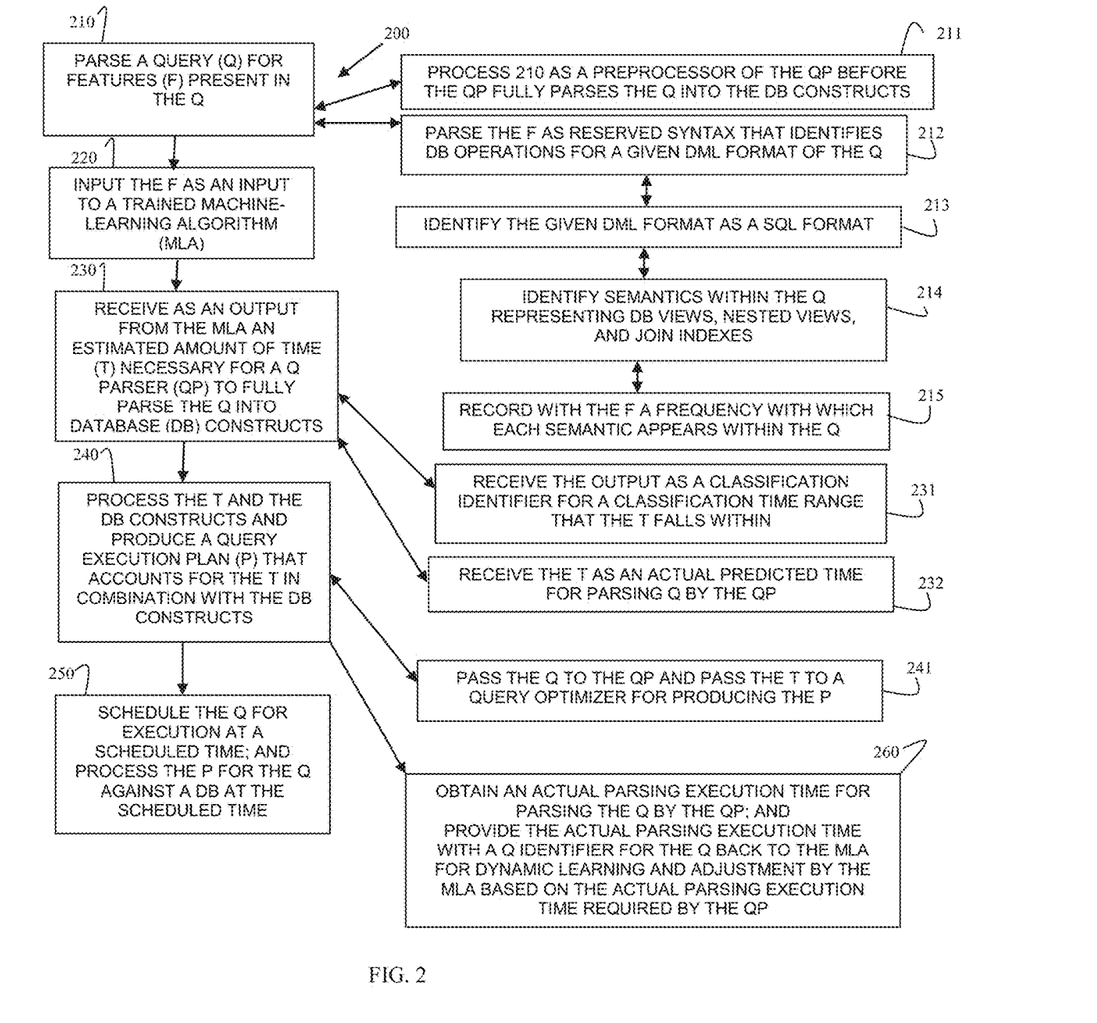
FIG. 2 is a diagram of a method for predictive query parsing time and optimization, according to an example embodiment.
Figure 3:
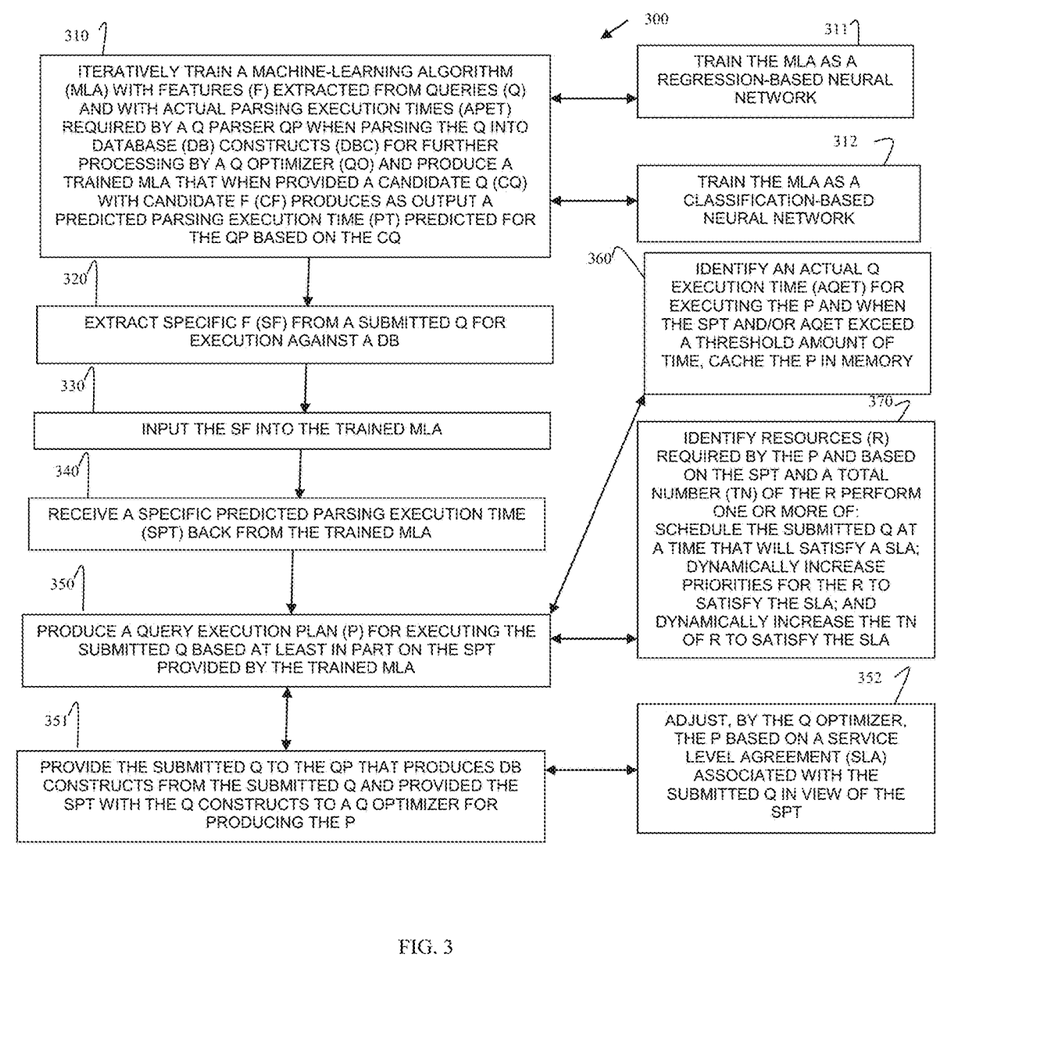
FIG. 3 is a diagram of another method for predictive query parsing time and optimization, according to an example embodiment.
Figure 4:
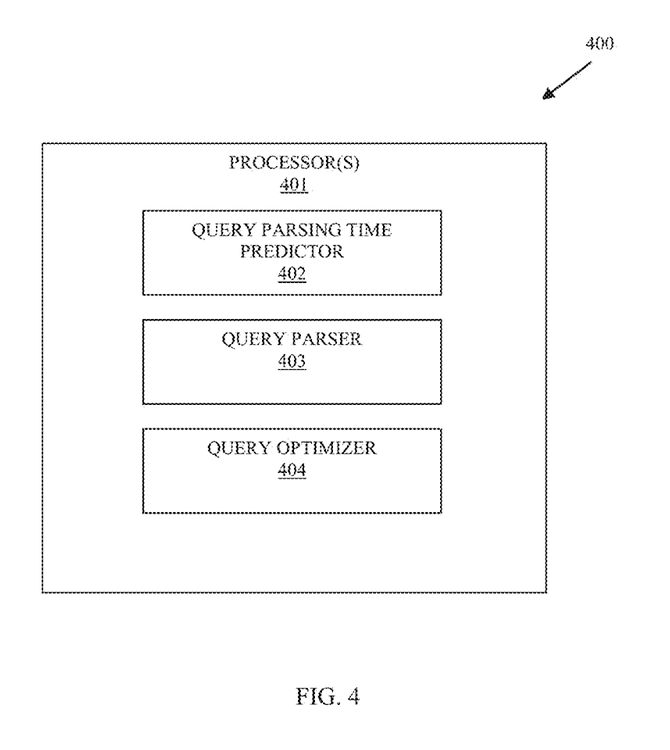
FIG. 4 is a diagram of a database for predictive query parsing time and optimization, according to an example embodiment.

These and other embodiments are now discussed with the FIGS. 2-4.

FIG. 2 is a diagram of a method 200 for predictive query parsing time and optimization, according to an example embodiment. The method 200 is implemented as one or more software modules referred to as a "query parsing time predictor"). The query parsing time predictor represents executable instructions that are programmed within memory or a non-transitory computer-readable medium and executed by one or more hardware processors of a device. The query parsing time predictor may have access to one or more network connections during processing, which can be wired, wireless, or a combination of wired and wireless.

In an embodiment, the query parsing time predictor is implemented within a data warehouse across one or more physical devices or nodes (computing devices) for execution over a network connection.

In an embodiment, the query parsing time predictor includes the predictor 102, the parser 103, and/or the optimizer 104. That is, the query parsing time predictor performs, inter alia, the processing as discussed above with the FIGS. 1A-1D.

At 210, the query parsing time predictor parses text of a query (submitted in a DML format, such as SQL format) for features present in the query text. In an embodiment, the features are any of the above-noted features discussed with reference to the FIGS. 1A-1D.

In an embodiment, at 211, the query parsing time predictor processes as a preprocessor or preprocessing step of a query parser of a database or database system before the query parser fully parses the query into database constructs (data structures and operations recognized by the database for the DML format of the query).

In an embodiment, at 212, the query parsing time predictor parses the features as reserved syntax that identifies database operations for a given DML format of the query.

In an embodiment of 212, at 213, the query parsing time predictor identifies the given DML format as a SQL format.

In an embodiment of 213, at 214, the query parsing time predictor identifies semantics present within the query representing database views, nested views, and join indexes.

In an embodiment of 214, at 215, the query parsing time predictor records, with each feature, a frequency with which each semantic appears within the query.

At 220, the query parsing time predictor inputs the features as an input to a trained machine-learning algorithm.

In an embodiment, the trained machine-learning algorithm is the predictor 102.

At 230, the query parsing time predictor receives as an output from the trained machine-learning algorithm an estimated amount of time predicted as being necessary for a query parser to fully and completely parse the query into database constructs recognized by and processed by the database and the query optimizer.

In an embodiment, at 231, the query parsing time predictor receives the output as a classification identifier for a classification time range that the estimated amount of time falls within.

In an embodiment, at 232, the query parsing time predictor receives the estimated amount of time as an actual predicted time for parsing the query by the query parser.

At 240, the query parsing time predictor processes the estimated amount of time and the database constructions and produces a query execution plan that accounts for the estimated amount of time in combination with the database constructs. That is, the typical optimization performed by a conventional optimizer is modified and enhanced to use the estimated amount of time as a factor when optimizing the query in the query execution plan.

According to an embodiment, at 241, the query parsing time predictor passes the query to the query parser and passes the estimated amount of time to a query optimizer of the database system for producing the query execution plan.

In an embodiment, at 250, the query parsing time predictor schedules the query for execution at a scheduled time and processes the query execution plan for the query against database tables of the database at the scheduled time.

In an embodiment, at 260, the query parsing time predictor obtains an actual parsing execution time for parsing the query by the query parser. That is, once the query parser has completely parsed the query into the database constructs, the actual execution time or elapsed execution time required by the query parser is known. The actual time may be housed in database statistics 106 for retrieval within the database system. The query parsing time predictor provides the actual parsing execution time with a query identifier that uniquely identifies the query back to the trained machine-learning algorithm for dynamical learning and adjustment by the trained machine-learning algorithm based on the actual parsing execution time required by the query parser. This perm its learning and adjustments of the weights and factors used by the trained machine-learning algorithm to ensure that the accuracy rate of the trained machine-learning algorithm is continually and dynamically improving over time.

FIG. 3 is a diagram of another method 300 for predictive query parsing time and optimization. The method 300 is implemented as one or more software modules referred to as a "machine-learning query parsing time predictor." The machine-learning query parsing time predictor represents executable instructions that are programmed within memory or a non-transitory computer-readable medium and executed by one or more hardware processors of a device. The machine-learning query parsing time predictor may have access to one or more network connections during processing, which can be wired, wireless, or a combination of wired and wireless.

The machine-learning query parsing time predictor presents another and in some ways enhanced perspective of the processing discussed above with the FIGS. 1A-1D and 2.

In an embodiment, the machine-learning query parsing time predictor is all or some combination of: the predictor 102, the parser 103, the optimizer 104, and/or the method 200.

At 310, the machine-learning query parsing time predictor iteratively trains a machine learning algorithm with features extracted from training queries and with the actual known parsing execution times required by a query parser when parsing the training queries into database constructions for further processing by a query optimizer. The machine-learning query parsing time predictor produces a trained machine-learning algorithm. The trained machine-learning algorithm when subsequently provided a candidate query with candidate features produces as output a predicted parsing execution time predicted for the query parser based on the candidate query.

In an embodiment, at 311, the machine-learning query parsing time predictor trains the machine-learning algorithm as a regression-based neural network (such as the regression-based neural network discussed above with the FIGS. 1A-1D).

In an embodiment, at 312, the machine-learning query parsing time predictor trains the machine-learning algorithm as a classification-based neural network (such as the classification-based neural network discussed above with the FIGS. 1A-1D).

In an embodiment, the machine-learning query parsing time predictor processes a preprocessor parser configured to parse the features rapidly from the training queries automatically and provide as input to the machine-learning algorithm during the training at 310.

In an embodiment of 313, the machine-learning query parsing time predictor provides the preprocessor as a front-end process or processing step to the query processor.

At 320, the machine-learning query parsing time predictor extracts specific features from a submitted production database query for execution against a database.

At 330, the machine-learning query parsing time predictor inputs the specific features into the trained machine-learning algorithm produced at 310.

At 340, the machine-learning query parsing time predictor receives a specific predicted parsing execution time back from the trained machine-learning algorithm.

At 350, the machine-learning query parsing time predictor produces a query execution plan for executing the submitted query based at least in part on the specific predicted parsing execution time received at 340. That is, the specific predicated parsing execution time drives (as at least one factor from a plurality of factors) the decisions made by the query optimizer when producing the query execution plan for the submitted query. The query execution plan is tailored at least partially or customized for the specific predicted parsing execution time.

In an embodiment, at 351, the machine-learning query parsing time predictor provides the submitted query to the query parser, which produces database constructs from the submitted query, and the machine-learning query parsing time predictor provides the specific predicted parsing execution time to a query optimizer. The query optimizer producing the query execution time based at least in part or using as one factor, the specific predicted parsing execution time.

In an embodiment of 351, at 352, the query optimizer adjusts the query execution plan based on a SLA associated with the submitted query in view of the specific predicted parsing execution time. That is, the specific predicated parsing execution time may indicate that the submitted query is within a range for response times that is problematic for the SLA, and in response thereto takes different or more focused optimization steps when producing the query execution plan to adjust what would normally be produced by the query optimizer.

In an embodiment, at 360, the query optimizer identifies an actual query execution time for executing the query execution plan and when the specific predicted parsing execution time and/or the actual query execution time exceeds a threshold amount of time (for example, 1 second), the query optimizer caches the query execution time in memory for subsequent execution of the query or similar queries.

In an embodiment, at 370, the query optimizer identifies resources required by the query execution plan and based on a the specific predicted parsing execution time (or an actual parsing execution time for the query) and a total number of the resources, the query optimizer performs processing for one or more of: scheduling the submitted query at a time that will be ensured to satisfy a SLA associated with the submitted query, dynamically increase priorities for the resources to ensure satisfaction of the SLA, and dynamically increase the total number of resources used in the query execution plan to satisfy the SLA.

FIG. 4 is a diagram of a database 400 for predictive query parsing time and optimization, according to an example embodiment. The database 400 includes a variety of hardware components and software components. The software components are programmed as executable instructions into memory and/or a non-transitory computer-readable medium for execution on the hardware components (hardware processors). The database 400 includes one or more network connections; the networks can be wired, wireless, or a combination of wired and wireless.

The database 400 implements, inter alia, the processing discussed above with the FIGS. 1A-1D and 2-3.

The database 400 includes at least one hardware processor 401 and a non-transitory computer-readable storage medium having executable instructions representing a query parsing time predictor 402, a query parser 403, and a query optimizer 404.

In an embodiment, the predictor 402 is all of some combination of: the predictor 102, the method 200, and/or the method 300.

In an embodiment, the predictor 402 and the parser 403 are one software module with the predictor 402 being a front-end preprocessor to the parser 403.

The predictor 402 is configured to execute on the at least one hardware processor 401 from the non-transitory computer-readable storage medium to perform processing to: extract features from a query, process the features to provide a predicted parsing execution time for the query parser 403 to parse the query into database constructs, provide the query to the query parser 403, and provide the predicted parsing execution time to the query optimizer 404.

In an embodiment, the predictor 402 is further configured to pass the features as input to a trained regression-based neural network or a trained classification-based neural network and receive the predicted parsing execution time as output from the trained regression-based neural network of the trained classification-based neural network.

The parser 403 is configured to execute on the at least one hardware processor 401 from the non-transitory computer-readable storage medium to perform processing to parse the query in a given DML format into database constructs recognized by the database 400 and the optimizer 404.

The optimizer 404 is configured to execute on the at least one hardware processor 401 from the non-transitory computer-readable storage medium and to perform processing to use the predicted parsing execution time along with the database constructions to produce a query execution plan for the query.

In an embodiment, the database 400 is a data warehouse that includes the AMPs 104.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The invention claimed is:

1. A method, comprising:
predicting a query parsing time using a trained machine-learning algorithm, wherein the predicted query parsing time comprises an estimated amount of time necessary for a query parser to fully parse a query, before the query parser fully parses the query, wherein the predicting comprises:
processing the query to extract features present in the query without fully parsing the query;
inputting the features to the trained machine-learning algorithm; and
receiving as an output from the trained machine-learning algorithm the predicted query parsing time; and
processing the predicted query parsing time in a query optimizer, the query optimizer using the predicted query parsing time as a factor in making different optimizations for the query, and producing a query execution plan for the query that accounts for the predicted query parsing time.

2. The method of claim 1, wherein processing further includes processing the query to identify the features using a preprocessor of the query parser before the query parser fully parses the query into the database constructs.

3. The method of claim 1, wherein the features comprise reserved syntax that identifies database operations for a given Data Manipulation Language (DML) format of the query.

4. The method of claim 3, wherein the given DML format is a Structured Query Language (SQL) format.

5. The method of claim 4, further comprising identifying semantics within the query representing database views, nested views, and join indexes.

6. The method of claim 5, further comprising recording with the features a frequency with which each semantic appears within the query.

7. The method of claim 1, wherein receiving further includes receiving the output as a classification identifier that identifies a classification time range that the estimated amount of time falls within.

8. The method of claim 1, wherein receiving further includes receiving the estimated amount of time as an actual predicted time for parsing the query by the query parser.

9. The method of claim 1, wherein processing further includes passing the query to the query parser and the estimated amount of time to the query optimizer for the producing of the query execution plan.

10. The method of claim 1 further comprising:
scheduling the query for execution at a scheduled time; and
processing the query execution plan for the query against a database at the scheduled time.

11. The method of claim 1 further comprising:
obtaining an actual parsing execution time for parsing the query by the query parser; and
providing the actual parsing execution time with a query identifier for the query back to the trained machine-learning algorithm for dynamic learning and adjustment by the trained machine-learning algorithm based on the actual parsing execution time required by the query parser.

12. A method, comprising:
iteratively training a machine-learning algorithm with features extracted from queries and with actual parsing execution times required by a query parser when parsing the queries into database constructs for further processing by a query optimizer, and
using the trained machine-learning algorithm when provided a candidate query with candidate features to produce as output a predicted parsing execution time for the query parser based on the candidate features of the candidate query, by:
extracting the candidate features from the candidate query without fully parsing the candidate query;
inputting the candidate features into the trained machine-learning algorithm;
receiving the predicted parsing execution time back from the trained machine-learning algorithm; and
making different optimizations for the candidate query in a query optimizer based at least in part on the predicted parsing execution time provided by the trained machine-learning algorithm, and producing a query execution plan for the candidate query that accounts for the predicted parsing execution time.

13. The method of claim 12, wherein iteratively training further includes training the machine-learning algorithm as a regression-based neural network.

14. The method of claim 12, wherein iteratively training further includes training the machine-learning algorithm as a classification-based neural network.

15. The method of claim 12, wherein producing further includes providing the candidate query to the query parser that produces database constructs from the candidate query and providing the predicted parsing execution time with the database constructs to the query optimizer for producing the query execution plan.

16. The method of claim 12, wherein providing further includes adjusting, by the query optimizer, the query execution plan based on a Service Level Agreement (SLA) associated with the candidate query in view of the predicted parsing execution time.

17. The method of claim 12, further comprising, identifying an actual query execution time for executing the query execution plan and when the predicted parsing execution time and/or the actual query execution time exceeds a threshold amount of time, caching the query execution plan in memory.

18. The method of claim 12, further comprising, identifying resources required by the query execution plan and based on the predicted parsing execution time and a total number of the resources performing one or more of:
scheduling the candidate query for execution to ensure a Service Level Agreement (SLA) for the candidate query is satisfied by the resources at a scheduled time;
dynamically increasing priorities for the resources to ensure the SLA is satisfied at the scheduled time; and
dynamically increase the total number of resources to ensure the SLA is satisfied.

19. A database, comprising:
at least one hardware processor;
a non-transitory computer-readable storage medium having executable instructions representing a query parsing time predictor, a query parser, and a query optimizer;
the query parsing time predictor configured to execute on the at least one hardware processor from the non-transitory computer-readable storage medium and to perform processing to:
extract features from a query without fully parsing the query, process the features using a trained machine-learning algorithm to provide a predicted parsing execution time for the query parser to fully parse the query into database constructs, provide the query to the query parser, and provide the predicted parsing execution time to the query optimizer;
the query parser configured to execute on the at least one hardware process from the non-transitory computer-readable storage medium and to perform processing to parse the query into the database constructs; and
the query optimizer configured to execute on the at least one hardware processor from the non-transitory computer-readable storage medium and to perform processing to use the predicted parsing execution time along with the database constructions as a factor in making different optimizations for the query and to produce a query execution plan for the query that accounts for the predicted parsing execution time.

20. The database of claim 19, wherein query parsing time predictor is further configured to pass the features as input to the trained machine-learning algorithm comprising a trained regression-based neural network or a trained classification-based neural network and receive the predicted parsing execution time as output from the trained regression-based neural network or the trained classification-based neural network.

* * * * *